United States Patent [19]

Cesano

[11] 4,328,067
[45] May 4, 1982

[54] LAMINATING METHOD AND APPARATUS

[75] Inventor: Franco Cesano, Pinerolo, Italy

[73] Assignee: G.O.R. Applicazioni Speciall S.p.A., Turin, Italy

[21] Appl. No.: 147,223

[22] Filed: May 6, 1980

Related U.S. Application Data

[62] Division of Ser. No. 52,106, Jun. 26, 1979, Pat. No. 4,243,456.

[30] Foreign Application Priority Data

Jun. 28, 1978 [CH] Switzerland .................... 7027/78

[51] Int. Cl.³ .............. B32B 31/00; A01J 21/02; A21C 3/00; B26D 1/02
[52] U.S. Cl. .................... 156/511; 156/267; 156/510; 156/252; 425/292; 425/395; 72/326; 83/514; 83/519; 156/253; 156/530
[58] Field of Search ............ 156/510, 515, 511, 530, 156/252, 214, 251, 212, 253, 216, 267, 250; 264/153, 163, 161, 139, 152; 425/302, 1, 301, 292, 235, 306, 352, 284, 395, DIG. 58; 72/186, 187, 434, 326, 417, 353, 418, 356, 376; 83/301, 396, 514, 519

[56] References Cited

U.S. PATENT DOCUMENTS

| | | | |
|---|---|---|---|
| 2,482,981 | 9/1949 | Kamrass | 156/324 |
| 3,234,774 | 2/1966 | Margedant | 72/326 |
| 4,104,349 | 8/1978 | Hillgenberg | 264/163 |

Primary Examiner—Edward C. Kimlin
Assistant Examiner—Louis Falasco
Attorney, Agent, or Firm—Holman & Stern

[57] ABSTRACT

Shaped and self-supporting stratiform laminates, such as inner door panels for automobiles, are produced from a thermoplastic substrate and a flexible sheet material in a one-stroke molding, laminating, and cutting operation; laminated products obtained have protruding free edge portions of the flexible coating sheet so that cut edge portions of substrate can be covered subsequently with the protruding free portions.

Apparatus for producing such laminates is a molding press having two molding plates, each of which includes one component of a pair of cutting means; the other two components of the pair of cutting means are provided by a generally annular element that is movable relative to the molding plates; the annular element includes a surface for cooperation with a peripheral knife around the surface of the upper molding plate to form one cutting means, and a cutting edge for cooperation with a shearing edge of the lower molding plate to form the second cutting means.

4 Claims, 6 Drawing Figures

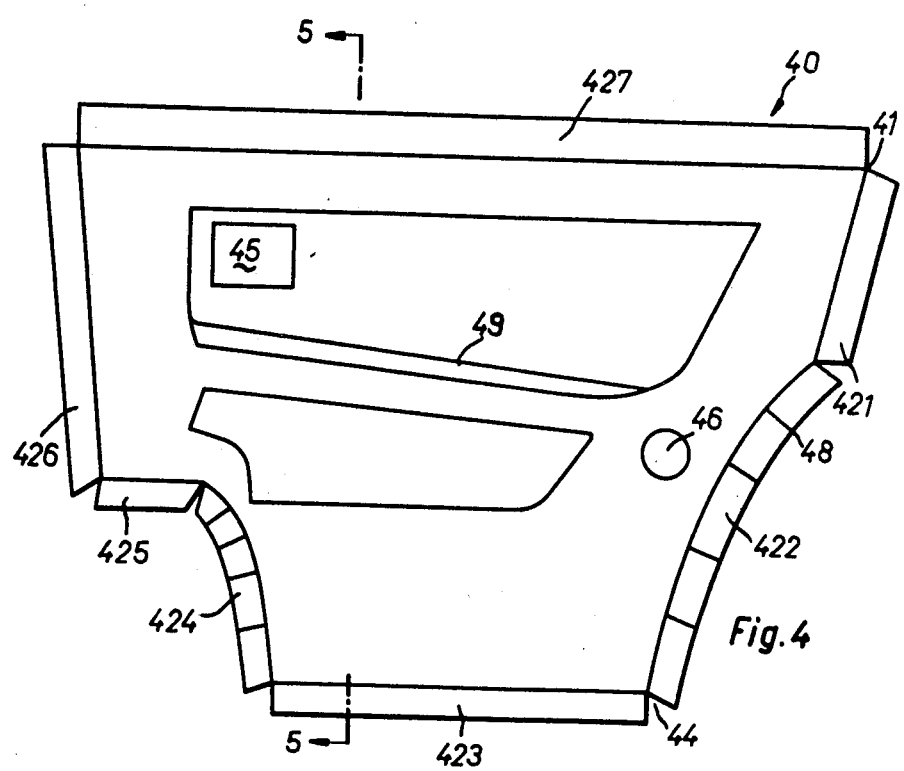
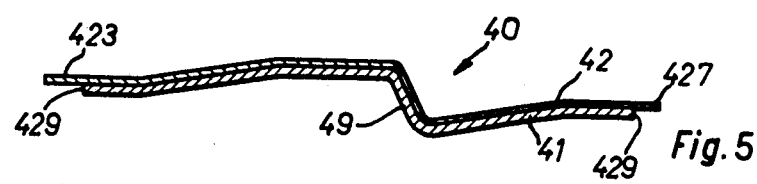
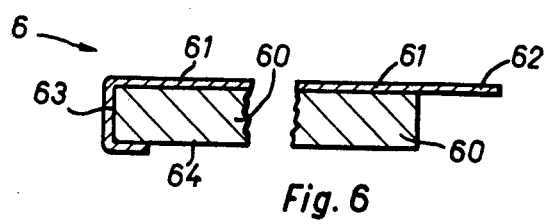

LAMINATING METHOD AND APPARATUS

CROSS-REFERENCE TO RELATED CASE

This application is a divisional of my U.S. application Ser. No. 52,106 filed June 26, 1979, now U.S. Pat. No. 4,243,456 issued Jan. 6, 1981.

BACKGROUND OF THE INVENTION

1. Field of the Invention

The present invention generally relates to the production of laminates formed of a substrate and a coating, and more particularly to making laminated self-supporting structures such as panels and the like stratiform elements of the type used at the interior of automobiles, e.g. as inner door panels.

2. Description of the Prior Art

Large stratiform and generally shaped moldings based upon synthetic polymers are generally produced by first molding the base substrate portion of the laminate in a molding device, e.g. a molding press, and by subsequently connecting the molded and generally rigid substrate with a suitable coating layer, e.g. by adhesive techniques or by mold pressing.

When trying to simplify this technique by using a laminated starting material which is molded in a press or the like device for producing a generally stratiform and shaped (profiled) self-supporting product, a general problem is the edge portion of the molded laminate.

The interior door panel of an automobile, for example, must have a substantially rigid supporting stratum which is coated on its passenger-exposed side with a flexible material for reasons of appearance and safety (cushioning effect). Now, assuming that an unshaped preformed laminate were to be used and shaped in a molding device, e.g. a conventional molding press, it is easily understandable that the support stratum will be exposed, that is, not covered by the coating layers, in its edge portions. While some parts of the resulting edge portions might be covered, when installed in an automobile door, by supports in the door, other edge portions will remain exposed to the eye and, what is even more critical, constitute a potential hazard.

For this reason, conventional automobile door panels are made by first shaping or molding the substrate portion and subsequently applying the coating or cushioning layer; the cushioning layer is dimensioned such that it overlaps the substrate, and its overlapping edge portions can be folded around any exposed edges of the substrate.

No conventional method known by applicant for producing self-supporting laminated structures is capable of avoiding the edge-covering problem set forth above in a one-stroke operation.

For example, U.S. Pat. No. 2,797,179 discloses a method for producing molded laminates in a molding press; in a first stroke of the press a coating layer is formed and shaped; then, the press is opened again to remove, reverse and reinsert the coating layer. In a second stroke of the press, the substrate is formed, laminated with the coating layer and cut by a shearing edge of the lower mold member or plate. At the cut edge of the laminated product obtained the substrate is exposed, that is, not covered by the coating layer. As is readily apparent, such operation is a two-stroke method (each stroke including a closing/opening cycle of the press) and thus rather time consuming per se. Further, no way to resolve the cut edge problems is apparent from the disclosure of U.S. Pat. No. 2,797,179 which relies on thermosetting materials for the substrate of the laminates.

Shaping (molding) of thermoplastic sheet materials per se is well known to the art, cf. U.S. Pat. No. 3,007,201. This technology is based upon thermal plastification, that is, heating an inherently rigid or brittle material to a temperature where such material becomes moldable, e.g. by stretching or drawing. It is believed by applicant that the concept of "thermal plastification" of thermoplastic polymers or polymer-based compositions includes a variety of transformations, depending upon the polymer and/or the filler-type constituents; the term as used in the present invention includes, for example, the temperature range of elastic elongation specified in U.S. Pat. No. 3,007,201 as well as plastification by softening of the polymer constituent when the latter is heated to a temperature above its softening or even melting temperature. For example, a suitable material for use as substrate in the present invention is disclosed in British Pat. No. 1,457,015 and comprises a thermoplastic polymer, such as polypropylene, and a non-thermoplastic filler, such as saw dust; such a composition is "thermoplastic" in the sense used herein and can be thermally plastified (used interchangeably herein with plasticized) by heating to temperatures well above the melting point of the polymer constituent.

Turning back to the art of shaping thermoplastic sheet materials, such as by the methods disclosed in the above mentioned U.S. Pat. No. 3,007,201 or in German Published Patent Application DE-AS No. 1,158,697, such methods include no lamination steps. Of course, various coating techniques are known in the thermoplastics art, e.g. from German Published Patent Application DE-OS No. 2,448,361, but here again the substrate is molded first and the coating layer applied thereafter, and, again, the above explained problem of the uncoated substrate edge is not resolved.

OBJECTS AND BRIEF SUMMARY OF THE INVENTION

Accordingly, it is a main object of the invention to provide for a novel method for producing self-supporting and generally stratiform laminates.

Another object of the invention is to provide for a novel one-stroke molding and lamination method which is capable to resolve the problem of covering edge portions of the laminated substrate.

Yet a further object of the invention is to provide for an improved method of producing laminated polymer-based panels of the type used in automobile manufacture.

Still a further object of the invention is a polymer-based and molded composite structure suitable for use as a self-supporting element, e.g. as a covering panel, having a substantially rigid substrate integrally connected with an adhering layer of a flexible material wherein the adhering layer extends beyond the substrate for subsequent covering of substrate edge portions.

A further object of the invention is an improved molding press for producing, in a one-stroke operation, laminated structures having unlaminated edge portions.

Further objects will become apparent as this specification proceeds.

It has been found according to the invention that the above objects and further improvements are achieved by means of a laminating technique using a thermomoldable and generally thermoplastic substrate material and a flexible coating sheet material, in which technique both the substrate and the flexible coating sheet material are molded and laminated in a one-stroke operation which includes at least two cutting steps; the first or press-cutting step is effected by contact of a peripheral cutting member provided on the upper mold member of a molding press and a surface portion of a generally annular member that is movable relative to both the upper and the lower mold member. As a result of the first or press-cutting step—effected by moving the upper mold member towards the lower mold member—the flexible coating sheet is cut independently, that is, without also cutting the substrate; thus, peripheral edge portions of the coating sheet can be formed to outwardly extend beyond the edge of the substrate that is cut in a subsequent second cutting step.

According to the invention, the second or shear-cutting step is effected by a cutting edge of the annular member when the latter is pressed in a downward direction and cooperates with a shearing edge of the lower mold member.

As will be explained in more detail below, the laminate thus obtained comprises an integral connection between the substrate and the coating layer at the interface of the layers but retains predetermined free edge portions of the coating layer which can be folded about edge portions of the substrate for adequate coverage. Securing of the folded edges at the backside of the substrate may be advantageous but is not critical.

A suitable press for the purpose of the invention includes the elements of a conventional molding press, notably a pair of mold members having suitable shaped and intermatching mold surfaces so as to define the mold of the stratiform structure to be produced plus the conventional means for supporting and reciprocatingly moving the mold members from an opened position (feeding and discharging position) into a "closed" (molding and laminating) position; pressure generators, pressure transfer, pressure control and general press operation control means are well known in the plastics molding art and will not be discussed in detail here.

According to the invention, three additional features are required for a molding press according to the invention: the first is a generally annular member that is reciprocatingly movable in the same directions as the molding members, that is, in a generally "upward" (press-opening) and a generally "downward" (press-closing) direction. In general, the annular member is guided along the path of its reciprocating movement, e.g. by the same means used to guide the path of the upper and/or lower mold member.

It should be emphasized that the term "annular" is not intended as a restriction to "circular"; what is meant by "annular" is a peripherally closed structure around a central opening thereof; this opening interfits with the lower mold member and can be moved to pass over a shearing edge provided thereon. A shearing edge on the lower mold member is disclosed in the above mentioned U.S. Pat. No. 2,797,179 for cooperating with the upper mold member and for cutting both the coating layer and the substrate in register.

In contrast, the shearing edge on the lower mold member of a molding press according to the invention cooperates with the cutting edge of the annular member to constitute a first cutting means that cuts but the substrate layer and constitutes a second feature of the inventive press.

The third essential feature of the improved molding press according to the invention is a second cutting member provided on the upper mold, e.g. in the form of a peripheral knife or blade for cooperating with a peripherally closed (i.e. "generally annular") surface portion of the movable annular member and forming a second or press-cutting means with such surface. This second cutting means cuts but the flexible coating layer of the substrate; the "radial" distance between the cutting edge of the annular member and the part of its upper surface portion where the second cutting member of the upper mold member contacts the surface will determine the "radial" width of the free edge portion of the coating layer that will protrude laterally over the cut substrate edge of a laminate made according to the invention.

The term "stratiform" is used to refer to such structures which have a substantial surface:thickness ratio, e.g. a coated or laminated interface area (at the interface between substrate and coating layers) of above 100 cm$^2$, notably in the range of from about 2500 to 10,000 cm$^2$ or above, and a thickness (distance between uncoated surface of substrate and adjacent top surface portion of the flexible coating layer) in the range of from about 3 to about 10 mm, preferably from about 4 to about 8 mm.

Stratiform laminates according to the invention are "self-supporting" in the sense that distinguishes them from thin sheets that will fold under their own weight. The term "self-supporting" does not exclude a certain amount of flexibility of the laminate. Again, the preferred example of an interior panel used in an automobile such as an internal door panel serves to illustrate the preferred general significance of this term.

As is known per se, such door panels will frequently be shaped in the sense of being profiled, i.e. have protruding and receding portions such as are required for topically reinforcing ridges and/or for armrests and the like. It is an important advantage of the inventive method that profiled laminates (e.g. with a profile depth in the range of from 3 to 15 cm) can be produced by molding and laminating in a one-stroke operation; as cycle periods (time span between two subsequent removals of product from press) of 1 minute or less can be achieved even when producing relatively large laminates (e.g. 0.6 to 0.9 m$^2$) it is apparent that the invention, inter alia, provides for a substantial improvement in the economical manufacture of panel elements suitable for semi-durable or durable goods.

PREFERRED EMBODIMENTS OF THE INVENTION

According to a generally preferred embodiment of the inventive method the substrate used is a sheet of a thermoplastic composition that includes as main ingredients a thermoplastic polymer (this term includes homopolymers, copolymers and mixtures thereof) and a filler, generally a particulate solid and/or reinforcing fibers and the like. The general requirement for a suitable substrate is twofold: first, its "rigidity" when at normal ambient temperature is essential; "rigid" is used interchangeably with "self-supporting". Secondly, the substrate must be capable of being press-molded, i.e. capable of thermal plastification, when heated to an elevated temperature, e.g. in the range of from 100° to 300° C., preferably in the range of from 150° to 250° C. Many polymer compositions are known to have this property. Polyolefin/filler mixes are given but as an example. ABS resins illustrate another suitable polymer class. Polypropylene is given as a specific example, notably when admixed with a filler, preferably an organic filler. Thermoplastic compositions disclosed in the above mentioned British Pat. No. 1,457,015 include from about 40 to about 60% by weight of thermoplastic polymer and from about 60 to about 40% by weight of an inorganic filler, such as saw dust, and represent a particularly preferred substrate material for the inventive method and can be thermally plastified at temperatures between 120° and 200° C., preferably between 160° and 190° C. In general, the preferred substrate material will have adhesive properties to the extent required for sealing with the coating layer upon laminating conditions.

When operating the inventive method in conjunction with production of substrate sheet material, e.g. by extrusion, the hot extrudate may be used directly, i.e. without prior heating. Preferably, the substrate sheet material is heated in an oven, e.g. at about 180° to 200° C., for thermal plastification.

Suitable flexible sheet materials for the coating layer include polymer sheets, e.g. sheets, films or foils made of polyvinyl chloride, generally in a pigmented and optionally in a foamed state. The thickness or gauge of the flexible sheet material will generally be less than that of the substrate layer, e.g. in the range of from about 0.5 to about 3 mm, neither limit being overly critical and depending upon the final use of the laminate.

Other examples of suitable flexible sheet materials include fiber layers including textile layers of the non-woven, woven, knitted or needled type.

Preferably, the sheet material for the coating layer should be capable of adhesive bonding or sealing with the substrate layer under laminating conditions so as to avoid using additional heat sealing layers or coatings even though such intermediate layers may be used in the inventive process if required.

Dimensioning requirements and preferred laminating conditions will be explained in more detail below.

BRIEF DESCRIPTION OF THE DRAWINGS

The present invention is illustrated by way of example and not limitation in the Figures of the accompanying drawings in which:

FIG. 4 is a simplified top view of a laminate produced according to the inventive method.

FIG. 5 is a sectional view along 5—5 of FIG. 4, and

FIG. 6 is a semi-diagrammatic broken-away sectional view of the edge portion of a laminate made according to the invention.

DETAILED DESCRIPTION OF PREFERRED EMBODIMENTS OF THE INVENTION

Figure 1:
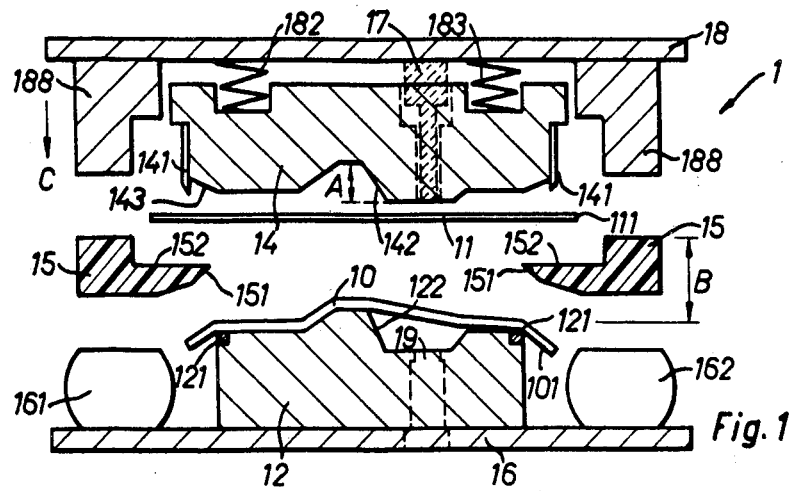
FIG. 1 is a semi-diagrammatic sectional view of the main elements of a molding press in an opened position of the mold members and upon introduction of substrate and coating layer.

The semi-diagrammatic view of press 1 in FIG. 1 shows but the main elements of the press and omits, for clarity, conventional elements of molding presses, such as press frame, guides for the movable press portions, pressure generator, press operation control, mold cooling conduits, temperature sensors, and the like.

A lower platen 16, e.g. of a conventional hydraulic press, supports lower mold member 12 having a profiled molding surface 122. Mold member 12 can be said to be the female die portion of press 1 and intermeshes by substantial conformity of its molding surface 122 with molding surface 142 of upper mold member 14 or the male die portion of press 1.

Surface 122 corresponds with the shape of the uncoated (back) side of the laminate to be produced and the peripheral edge 121 of lower mold member 12 is in the form of a shearing edge, e.g. a conventional cutter insert.

A thermally plasticized sheet 10 of a thermoplastic substrate material, e.g. polypropylene/wood composition having a gauge of about 3 mm and a temperature of about 180° C., is loosely placed onto lower mold member 12 so as to completely cover mold surface 122 and to overlap surface 122 on all sides by a margin portion 101. It will be appreciated that the thickness of both layers 10 and 11 is exaggerated for purposes of illustration as a typical cross-dimension of sheets 10, 11 will be in the range of from about 30 to about 100 cm.

Upper mold member 14 is connected movably (in a manner not shown) with upper platen 18 of press 1. Resilient pressure-deformable elements 182, 183 are arranged between platen 18 and mold member 14; the function of these resilient elements will be explained more below.

As regards "profile", the maximum profile depth of the mold members is indicated by "A" as the linear distance from the most elevated surface portion to the most recessed surface portion. The shape or profile of surface 142 of upper mold member 14 determines the shape and may influence the surface structure of the coating layer of the final laminate. As the substrate layer of the laminate need not have an entirely uniform thickness, strict conformity of the molding surfaces 142, 122 is not critical.

Profile depth "A" does not have a critical lower limit; its upper limit depends somewhat upon the material used but may be ten or even thirty times greater than the thickness of substrate layer 10.

A cutting member 141, e.g. a continuous knife edge, is arranged around and connected with upper mold member 14 at the end of its slightly recessed outer edge portion 143.

A flexible film or sheet 11, e.g. a polyvinyl chloride sheet, for the coating layer of the laminate is dimensioned so that its margin portion 111 extends on all sides over the working surface of upper mold member 14 defined by cutting member 141. Sheet 11 can be held by clamp means (not shown).

Annular element 15 is movably arranged between mold members 12, 14 vertically guided (by means not shown) for reciprocating movement indicated by double arrow B. Inner edge 151, viewed in a horizontal plane, is shaped to matchingly fit around shearing edge 121 of mold member 12 and may have a cutting insert and, in any case, constitutes a cutting member that interacts with shearing edge 121 to constitute a first cutting means when element 15 is moved downwardly along "B".

Member 15 has an upper surface portion 152 acting as a thrust face for cutting member 141 and forming a second cutting means therewith when platen 18 moves upper mold member 14 in the direction of arrow C and when the margin portion 111 of coating sheet 11 comes to rest on surface portion 152.

Lower platen 16 of press 1 supports resilient holding members 162, 161 while upper platen 18 is connected with distancing push elements 188 for interaction with annular element 15. Upper mold member 14 may include one or more punch dies (as indicated in broken lines for male punch die 17), in which case the lower mold member 12 will be provided with corresponding punch holes (as indicated in broken lines for female punch member 19). Such punch die or dies can be maintained by resilient means (not shown) in the non-operative position shown in FIGS. 1 and 2 and actuated by press closure via platen 18 as shown in FIG. 3 to punch or cut one or more perforations into the laminate as part of the one-stroke operation.

Figure 2:
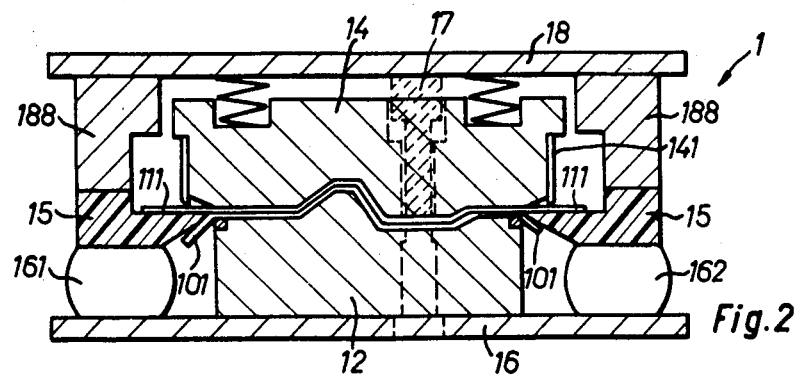
FIG. 2 is a view of the press of FIG. 1 in a nearly closed position upon cutting of the substantially shaped coating layer and before cutting of the substantially shaped substrate layer.
Figure 3:
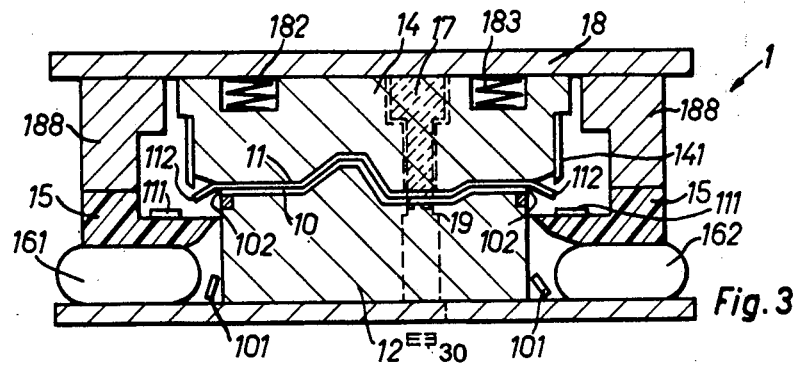
FIG. 3 is a view of the press of FIG. 1 in fully closed position after cutting of the substrate layer and upon conclusion of lamination.

Now, upon movement of upper platen 18 in a downward direction as indicated by arrow C, the press position shown in FIG. 2 will be reached. At this stage, both substrate layer 10 and coating layer 11 will have been molded to substantially conform with the mold defined by upper and lower mold members 14, 12. It will be understood that such molding may proceed gradually during the downward movement of mold member 14 due to increasing contact of layers 10, 11 with molding surfaces 122, 142.

Annular member 15 comes to rest on resilient members 161, 162 and is maintained by these members in an intermediate position for interaction of cutting member 141 and surface 152 but not for substantial interaction of cutting edge 151 and shearing edge 121. Preferably, a small gap (not shown in FIG. 2) remains between the lower faces of distancing members 188 and the upper face of annular member 15 so that resilient members 182, 183 will be deformed by the continuing downward movement of platen 18.

In this connection it is preferred that (upper) resilient members 182, 183 will be deformed by a pressure that does not deform (lower) resilient members 161, 162. When upper resilient members 182, 183 have a somewhat lower threshold of deformation than lower resilient members 161, 162, annular member 15 will be supported by members 161, 162 so as to ascertain interaction of cutting member 141 with surface 152 for cutting off margin portions 111 of the coating layer under a pressure defined and predetermined by resilient elements 182, 183. At the same time, resilient elements 182, 183 provide for a gradual increase of the laminating pressure exerted upon layers 10, 11. As an example, the threshold pressure of compressing deformation of resilient elements 161, 162 can be 15 to 30% larger than the threshold pressure required for compressive deformation of resilient elements 182, 183.

As is apparent from FIG. 2, marginal portions 111 of the coating layer 11 will be cut at a distance from the line where substrate layer 10 will be cut later upon further downward movement of annular element 15.

After full compression of resilient elements 182, 183 as shown in FIG. 3 and upon further downward movement of press platen 18, the threshold value of deformation of the resilient elements 161, 162 will be reached eventually and element 15 will now again move downwardly so that its cutting edge 151 interacts with shearing edge 121 of lower mold member 12 to form a separate cutting means for substrate 10, the margin portions 101 are cut off to produce substrate edge 102 while previously cut free edge portions 112 of coating layer 11 are retained.

Finally, that is, ater completion of both cutting steps and after compression of resilient elements 161, 162, press platen 18 bears directly upon upper mold member 14 and through layers 10, 11 onto lower mold member 12 for full and final lamination, e.g. at a pressure in the range of from about 3 to about 10 kg/cm$^2$.

In this stage of press operation punch die 17 has come into operation to cut one or more perforations through the laminate as die 17 is pressed by platen 18 into punch hole 19 so as to cut out portion 30 from the laminate. Preferably, both mold members are cooled in a manner known per se by a circulating coolant. Such cooling may prevent undesired deformation of a thermoplastic coating layer and accelerate solidification of the thermally plastified substrate.

Finally, press 1 is opened so that the laminate produced can be removed. The elements of press 1 are returned onto the positions shown in FIG. 1 and the subsequent one-stroke cycle for producing another laminate starts with introduction of another substrate layer 10 and coating layer 11 as explained above. To facilitate removal of the finished laminate from press 1, conventional releasing means can be used.

The following example is given to further illustrate the invention:

A molding press structure substantially as shown in FIGS. 1-3 was used to produce the laminate illustrated in FIGS. 4-6, an automobile door panel 40 shown in a simplified top view in FIG. 4 (coated side upwardly). Perforations 45, 46 for receiving door opening and window operating means (not shown) were formed by punches of the type indicated by die members 17, 19 in FIGS. 1-3. Alternatively, such or some of such perforations are produced in a separate operation.

The self-supporting stratiform laminate in the form of a door panel 40 was provided with a profile substantially as shown in FIG. 5 and including a protruding arm rest 49 by the shape of mold surfaces 122, 142. The cutting member 141 was shaped to cut laterally projecting or overlapping free margin portions 421-427 of the coating layer 42 with folding angles 44 and folding cuts 48. As illustrated in FIG. 6, any such overlapping portion 62 (right side of FIG. 6) of coating layer 61 can be folded to cover edge 63 of substrate 60 and may extend to the rear surface 64 thereof as indicated at the left side of FIG. 6. Such folding can be done manually or in an automated manner prior to car assembly and securing means or adhesives can be used to secure the overlapping portions. Alternatively, the edges 429 of door panel 40 may be covered by the overlapping portions 423, 427 of the coating layer 42 when securing panel 40 to the frame of the automobile door with conventional clamps (not shown) and inserting the portions 423, 427 between the frame and the backside of the panel.

When producing laminate 40 (FIG. 4) in press 1 (FIGS. 1-3), a 3 mm gauge sheet material made of substantially equal parts by weight of polypropylene and saw dust was used as layer 10 after thermal plastification at about 180° C. The coating layer 11 was a flexible foamed PVC sheet having a closed outer surface and a thickness of about 1.5 mm.

Insertion of the thermally plastified sheet and of the coating sheet took about 10 to 20 seconds; the second step (transition from press position of FIG. 1 into that of FIG. 3) was effected within about 1 second. Full pressure of about 7 kg/cm$^2$ in the press position of FIG. 3 for complete lamination and solidification was maintained for about 40 seconds.

Thus, cycle periods of about 1 minute can be maintained to produce an hourly output of more than 50 panels.

The threshold pressure of upper resilient members was 40,000 kg while the threshold pressure of lower resilient members was 54,000 kg. The laminated interface of panel 40 was about 0.8 m$^2$.

As will be apparent to one experienced in the plastics molding art, various modifications may be made in the above disclosed process, product and apparatus. For example, various other materials can be used for the substrate and the coating layer; the molding surface of the upper mold member may be structured for embossing the coating of the laminate. Further, as an alternative to using flexible polymer films such as those made from PVC, polyurethane and the like, various textile materials of the type used for panels of cars or furniture can be used as the coating layer including cloth, carpeting, velvet and the like or leather, both of natural or synthetic provenience. As is readily apparent, maximum profile depth and flexibility or stretchability of a given material for the coating layer may have to be considered for optimum laminating results.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purpose of the disclosure without departing from the spirit and scope of the invention.

Protection by Letters Patent of this invention in all its aspects as the same are set forth in the appended claims is sought to the broadest extent that the prior art allows.

What is claimed is:

1. In a molding press for laminatingly connecting a substrate layer and a coating layer; said press comprising an upper mold member and a lower mold member, each of said mold members having a molding surface and said mold members being movable in a reciprocating manner between an opened position and a closed molding position; the improvement consisting of providing a movable member having (A) a cutting edge capable of forming a first cutting means with a shearing edge of said lower mold member and (B) a surface portion capable of forming a second cutting means with a cutting member on said upper mold member; said second cutting means being arranged peripherally distanced from said first cutting means to provide for cutting of said substrate layer while leaving overlapping free edge portions of said coating layer.

2. The molding press of claim 1 additionally comprising resilient support means for temporarily maintaining said annular member in a position for forming said second cutting means upon contact of said surface of said annular member with said cutting member on said upper mold member.

3. The molding press of claim 2 additionally comprising resilient connecting means between said upper mold member and an upper platen of said press.

4. The molding press of claim 2 additionally comprising at least one additional cutting means formed by a punch die member in said upper mold member and a punch hole member in said lower mold member.

* * * * *